United States Patent [19]
Sudyk et al.

[11] 3,746,414
[45] July 17, 1973

[54] WATER LUBRICATED STAVE BEARING
[75] Inventors: John R. Sudyk, Huntsburg; Donald W. Finefrock, Burton, both of Ohio
[73] Assignee: The Johnson Rubber Company, Middlefield, Ohio
[22] Filed: Oct. 29, 1971
[21] Appl. No.: 194,770

[52] U.S. Cl. .......................... 308/238, 308/DIG. 12
[51] Int. Cl. .............................................. F16c 27/06
[58] Field of Search ...................... 308/238, DIG. 12, 308/36

[56] References Cited
UNITED STATES PATENTS
1,895,936  1/1933  Merrill ............................... 308/238
2,381,249  8/1945  Bastian .............................. 308/238
3,637,273  1/1972  Orndorff, Jr. ...................... 308/238
2,339,645  1/1944  MacGill ............................. 308/238
3,131,977  5/1964  Wirtz ................................. 308/238

Primary Examiner—Charles J. Myhre
Assistant Examiner—Barry Grossman
Attorney—Harold F. McNenny, William A. Gail et al.

[57] ABSTRACT

A demountable water lubricated rubber stave bearing is disclosed. Two different stave mounting systems are illustrated which can be used independently or in combination. One system employs rods which mechanically position the staves in the housing, support the staves along their length and secure removable end plates in position. The other mounting system employs deformable elastomeric inserts which are prestressed and produce a peripherally directed force on the staves. The structure is arranged to accommodate both axially directed and peripherally directed expansion and contraction of the stave material.

23 Claims, 13 Drawing Figures

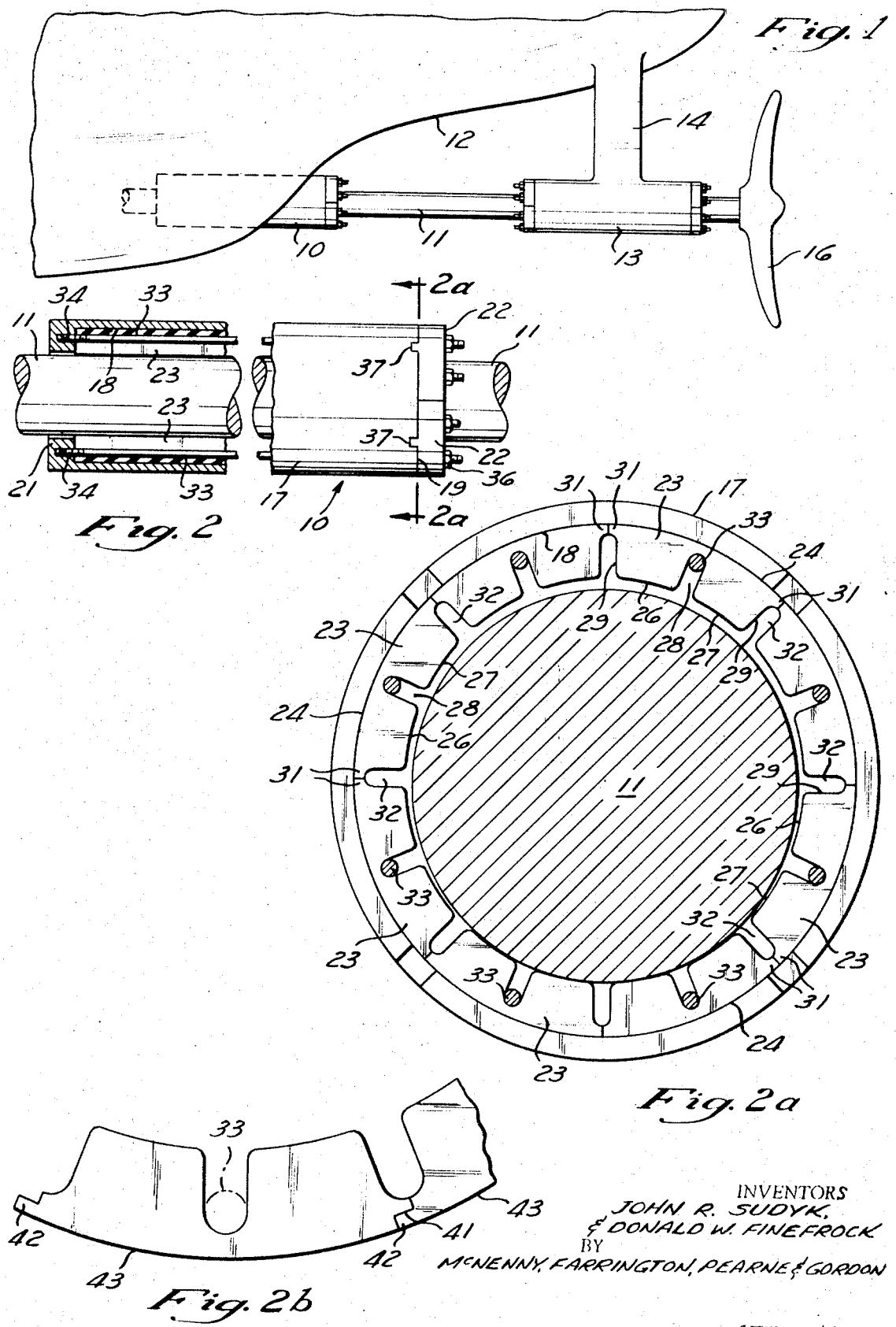

INVENTORS
JOHN R. SUDYK,
& DONALD W. FINEFROCK
BY
McNENNY, FARRINGTON, PEARNE & GORDON

ATTORNEYS

INVENTORS
JOHN R. SUDYK,
& DONALD W. FINEFROCK
BY
MCNENNY, FARRINGTON, PEARNE & GORDON

ATTORNEYS

WATER LUBRICATED STAVE BEARING

BACKGROUND OF THE INVENTION

This invention relates generally to stave bearings and more particularly to a novel and improved water lubricated demountable stave bearing.

PRIOR ART

Various types of water lubricated stave bearings are known. In many instances, the staves of such bearings have been secured in position by providing dovetailed type grooves in the housing along which the staves are inserted. In other instances, lengthwise mounting pieces are secured to the inside of the bearing housing to secure one or more staves in position. Examples of such structures are illustrated in the U.S. Pat. Nos. 1,885,339; 1,895,936; and 2,393,017.

In other instances, staves are secured in bearing housings by a clamping action. In the U.S. Pat. No. 3,407,779, separate housing halves are clamped together to radially clamp the staves in position. In the U.S. Pat. No. 3,606,505 (Ser. No. 653,796, filed July 17, 1967) endwise compression of the staves causes the staves to increase in their lateral dimension and causes radial clamping forces to occur between the staves in the bearing housing. In each of these latter patents, the structure is arranged so that the stave may be assembled or disassembled around a shaft while such shaft remains in position within the bearing housing. Such bearings are, therefore, generally referred to as "demountable" bearings.

SUMMARY OF THE INVENTION

A number of embodiments of bearings incorporating this invention are disclosed herein. In each embodiment, the bearing is demountable in that the staves may be assembled or disassembled around a shaft extending through the bearing housing. In accordance with one important aspect of this invention, the staves are mechanically secured in position by longitudinally extending rods which are removably mounted at their ends in the bearing housing. When the bearing is assembled, the rods hold the end plates in place on the housing and also secure the staves in position. The rods and staves are assembled or removed by endwise movement and a solid bearing housing having a smooth cylindrical bore is used.

In accordance with another aspect of this invention, the structure is arranged to permit expansion and contraction of the stave material to occur without producing excessive increases or decreases in the clearance between the staves and the shaft. This is particularly important where the bearing must operate under widely varying temperature conditions since the elastomeric material used to form the staves has a substantially greater coefficient of thermal expansion than the metal of the housing.

In accordance with another aspect of this invention, longitudinal elastomeric inserts are provided between the staves which resiliently urge adjacent edges of the staves apart and consequently, produce a radially directed force of engagement between the outer surfaces of the staves and the bearing housing. These inserts provide a seal between adjacent staves to prevent penetration of water and other foreign matter and, in addition, accommodate for thermal expansion and contraction. Such inserts may be used with mounting rods or used without rods in bearings in which they provide the principal mounting structure for the staves.

In accordance with another aspect of this invention, a given size of stave may be used in different bearing sizes. Such staves when unstressed may have a different radius of curvature than the bearing housing. In the embodiment illustrating this aspect of this invention, elastomeric inserts are positioned between adjacent staves to deform the staves from their unstressed condition until they are fully seated in the housing.

In accordance with another aspect of this invention, a relatively thin bearing housing is provided which is installed in the ship's structure by a layer of material which is cast in place. Such a bearing is installed without requiring close tolerance machining operations on the ship's supporting structure.

These and other important aspects of this invention are more fully described in the following detailed description of the drawings.

BRIEF DESCRIPTION OF THE DRAWINGS

FIG. 1 is a schematic fragmentary view illustrating a typical marine installation of bearings in accordance with this invention on the hull of a ship;

FIG. 2 is an enlarged view partially in longitudinal section of the stern tube bearing illustrated in FIG. 1;

FIG. 2a is an enlarged cross section taken generally along 2a—2a of FIG. 2;

FIG. 2b is an enlarged fragmentary view of a modified form of stave structure which may be used in a bearing of the type illustrated in FIGS. 2 and 2a;

FIG. 4 is an enlarged fragmentary section of the outboard bearing illustrated in FIG. 1 taken generally along 4—4 of FIG. 4a;

FIG. 4b is a perspective view partially broken away illustrating the structure of the elastomeric inserts positioned between the staves of the bearing of FIG. 4a;

DETAILED DESCRIPTION OF THE DRAWINGS

Figure 3:
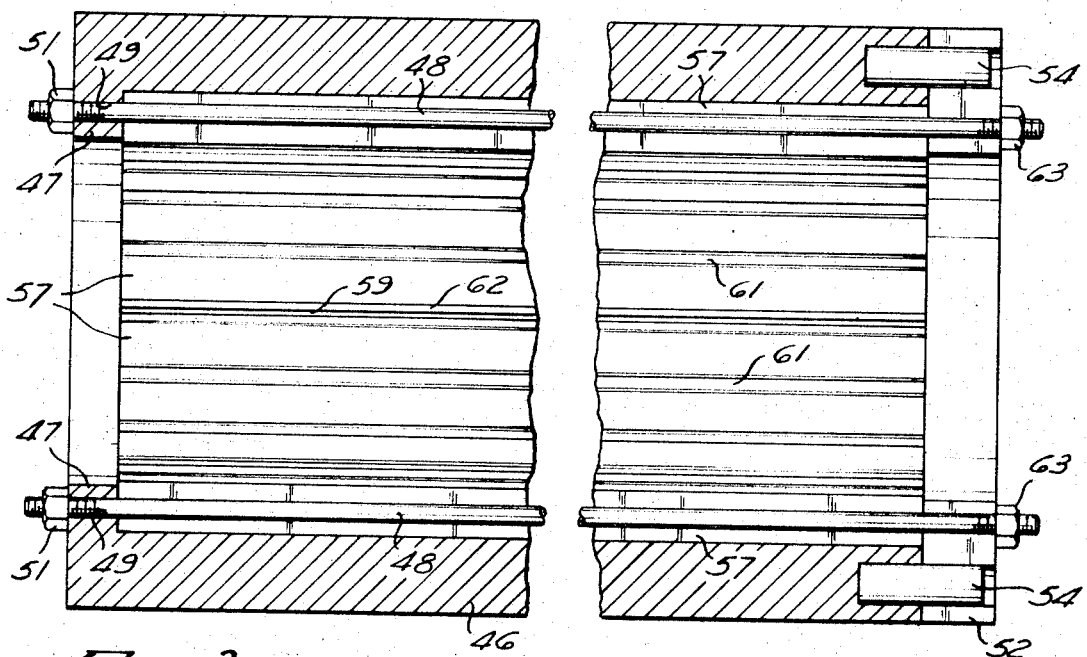
FIG. 3 is an enlarged broken longitudinal section of another embodiment of bearings incorporating this invention.

FIG. 1 illustrates a typical marine installation of water lubricated rubber bearings on a main propulsion shaft of a ship. A stern tube bearing 10 surrounds the shaft 11 where it emerges from the ship's hull 12. An outboard bearing 13 is mounted on a strut 14 extending from the hull 12 and journals the shaft 11 adjacent to a propeller 16 mounted on the end of the shaft 11.

In usual practice, a gland system is provided inboard of the stern tube bearing 10 to prevent water from flowing into the hull of a ship and in some instances water under pressure is supplied to at least the stern tube bearing for lubricating the bearing. Since the present invention is directed to the structure of the bearing per se, such accessory or related structures are not illustrated.

FIGS. 2 and 2a illustrate the structure of one preferred embodiment of a bearing particularly suited for installation as the stern tube bearing. In this embodiment, a cylindrical housing 17 is provided with a smooth cylindrical bore 18 extending from one end 19 of the housing 17 to an inturned flange 21. Mounted on the end 19 of the housing 17 is an end plate or ring assembly consisting of two semicylindrical end plates 22. The inturned flange 21 and the end plates 22 are sized to fit around the shaft 11 with clearance. Positioned within the bore 18 between the flange 21 and the end plates 22 are a plurality of similar elongated stave members 23. The staves 23 illustrated in FIGS. 2 and 2a are formed entirely of elastomeric rubber-like material and have a cross section best illustrated in FIG. 2a. Each stave has an outer surface portion 24 which engages the surface of the bore 18 and a pair of inner bearing surface portions 26 and 27 adapted to engage the surface of the shaft 11. The inner bearing surfaces 26 and 27 of each stave are separated by a radially extending axial groove 28. The lateral edge of each stave is formed with a recess 29 extending radially from the adjacent bearing surface 26 and 27 to a lip 31 adjacent to the outer surface 24. The recess 29 and lip 31 of each stave cooperates with an associated recess and lip on an adjacent stave to define a radially extending groove 32 which in the illustrated embodiment is similar in size and shape to the groove 28. In FIG. 2a, the staves are illustrated as proportioned so that the lips 31 on one stave engage the associated lip 31 on the adjacent stave. However, such engagement is not essential, and a small clearance provided between associated lips 31 facilitates the insertion and removal of the staves. Such clearance is not illustrated in order to simplify the drawings.

A mounting rod 33 extends along the bottom of the groove 28 in each stave 23, and secures each stave in its proper position within the housing. The rods 33 are threaded at both ends and in the embodiment of FIGS. 2 and 2a, are threaded at their inner ends into tapped holes 34 in the inturned flange 21. The outer ends of the rods extend through close fitting bores in the end plates 22 and are provided with nuts 36 which hold the end plates 22 against the end face 19. When assembled, the rods therefore function to mount the end plates 22 and also to properly position the associated stave. Keytype projections 37 formed on the end plates 22 fit into mating keyways formed on the end of the housing 17 to insure that the end plates are properly positioned at the end of the housing 17.

Assembly and disassembly of the bearing can be performed while the shaft 11 extends through the bearing. For disassembly, the nuts 36 are removed permitting removal of the two end plates 22. The rods 33 are then threaded out of the associated tapped holes 34 and removed. The staves 23 are then removed from the housing by endwise movement. Removal of the lower stave, of course, requires jacking of the shaft 11 in any suitable manner to lift the shaft 11 off of such staves. Reassembly is then accomplished in the reverse order. Preferably, at least one rod 33 is threaded at its inner end into its associated tapped hole prior to the insertion of the associated stave which is the first stave installed to insure that the staves will be properly oriented with respect to the tapped holes 34 in the inturned flange 21, and the holes in the end plates 22 through which the respective rods extend. In practice, the lower compliment of stave and rods are assembled first with the shaft 11 jacked up to provide clearance for the insertion of such staves. The lower end plate 22 is then positioned and the associated nuts 36 are installed. The shaft 11 is then released so that it rests on the lower compliment of staves and provides the full clearance at the upper side of the bearing. The upper compliment of staves and rods are then installed after which the upper end plate 22 and the nuts 36 are installed.

Because the rods 33 are anchored in the bearing housing at both ends, they function to properly position the staves 23 within the housing by providing a positive mechanical means for positioning the stave. Further, the rods 33 because they extend the full length of the staves provide support for the staves throughout their length. In this embodiment, the staves are preferably sized to provide clearance between the adjacent lips 31 so that interference will not exist when the staves are assembled. Further, the depth of the grooves 28 is proportioned so that they receive the rods 33 without interference. This facilitates the assembly of the bearing.

The grooves 28 along which the rods 33 extend and the grooves 33 perform a dual function. They provide passages along which the lubricating water flows to wet the surface of the shaft 11 and provide full lubrication of the bearing. They also provide an unrestrained surface to accommodate thermal expansion of the material forming the stave. Consequently, when the stave material expands due to increase in temperature, the material expands in the peripheral direction to reduce the sizes of the openings or grooves 28 and 32, and such expansion does not cause excessive reduction in the radial clearance provided between the bearing surfaces and the shaft.

The staves are also sized to provide endwise clearance with respect to the housing to accommodate longitudinal thermal expansion. With this structure, only the radial expansion and contraction which occurs due to temperature changes affects the clearance. Such radial expansion and contraction, however, is relatively small since the thickness of the stave is not great. Consequently, the desired clearance is maintained under widely varying temperature conditions.

The illustrated structure has an additional advantage. Since the rods which mount the staves in position extend along the stave zone of the bearing, the bearing housing can be made relatively thin and only need be thick enough to sustain the bearing load. The various elements are proportioned so that the rods 33 are spaced from the inner wall 18 of the bearing housing a sufficient distance to provide enough stave material therebetween to insure that the two sections of each stave are adequately connected.

In the embodiment of FIG. 2b, the stave cross section is modified to provide a recess 41 along one edge which is proportioned to receive an axially extending projection 42 on the opposite edge of an adjacent stave. This structure provides a tongue and groove connection so that the staves overlap along their joint to reduce the tendency of water and other foreign matter from reaching the outer surface 43 of the stave where they seat in the housing 17. It should be understood that the staves as illustrated in FIG. 2b are secured by rods 33 within a housing 17 in the same manner as the embodiment of FIG. 2a.

Figure 3A:
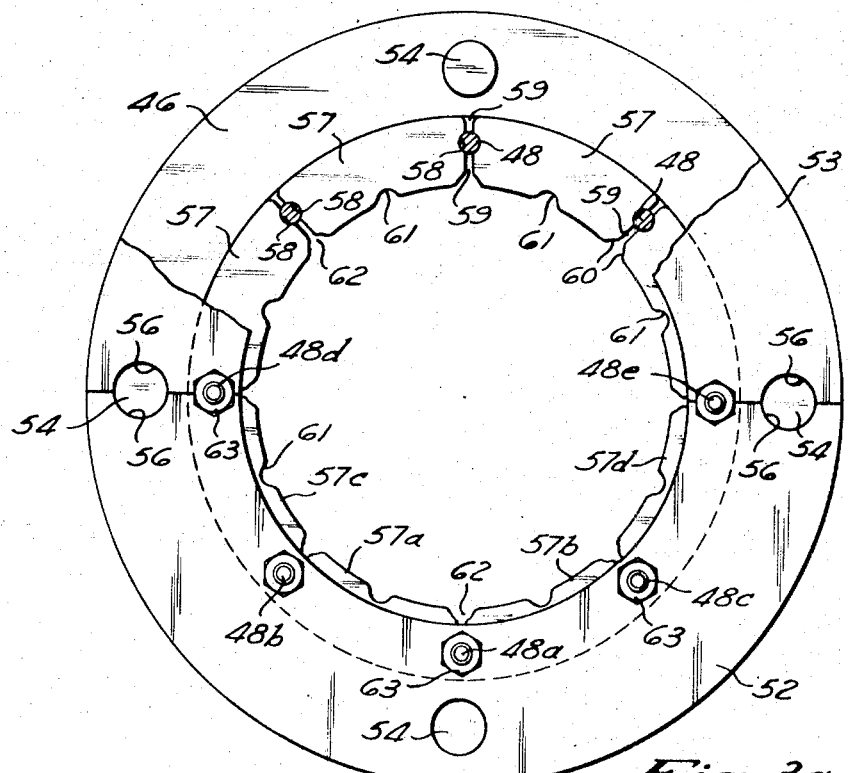
FIG. 3a is an end view partially in section of the bearing illustrated in FIG. 3.

FIGS. 3 and 3a illustrate a second embodiment of this invention. In this embodiment, a housing 46 is again provided with an inturned flange 47 at one end. In this instance, the rods 48 extend through apertures 49 in the inturned flange and are provided with nuts 51. Mounted at the other end of the housing 10 are a pair of end plates 52 and 53. Four dowel pins 54 are mounted in the end of the housing 46. Two of the pins 54 mate with semicylindrical grooves 56 formed in the ends of end plates 52 and 53, and two pins extend into holes in the end plates. The pins insure proper location of the two end plates with respect to the housing 46.

In the embodiment of FIGS. 3 and 3a, the staves 57 are positioned between the rods 48 so the staves are secured in position by rods which extend along opposite longitudinal edges of each stave. Preferably, the staves 57 are formed with semicylindrical grooves 58 along their longitudinal edges which mate with the adjacent side of the adjacent rods 48. The lateral edges of the staves are proportioned so that a spacing or clearance 59 is provided between staves both radially inward and radially outward of the adjacent rods 48. Such clearance facilitates the insertion and removal of the stave and, in addition, provides a clearance to accommodate peripherally directed thermal expansion of the stave when the temperature of the staves is increased.

The inner face of the staves is formed with a central longitudinally extending water groove 61 and the edges are chamfered at 60 to cooperate and define a second water groove 62 between adjacent staves. The nuts 63 threaded onto the ends of the rods mount the end plates and complete the assembly.

The preferred procedure for assembling the bearing of FIGS. 3 and 3a is as follows. The lower-most rod 48a is first inserted while the associated shaft is jacked to provide clearance at the bottom of the bearing. Next, the bearing staves 57a and 57b are positioned along opposite sides of the rod 48a. The rods 48b and 48c are next inserted followed by the staves 57c and 57d. The lower end plate 52 is then positioned and the nuts 63 are placed on the rods. Subsequently, the rods 48d and 48e are installed. The shaft is then lowered to provide all of the clearance at the upper side of the bearing and the upper compliment of staves and rods are installed. Because the rods are metal and can be lubricated before pressing them along the staves, the various elements can be proportioned so that the rods and staves provide a firm contact to minimize the tendency for water to flow radially outward past the rods into the zone between the housing and the staves. Such close fit does not produce a severe problem since the last rod can be lubricated before it is pressed along the stave into its mounted position. Such close fit or even an interference fit, however, does not prevent peripherally directed thermal expansion of the stave when the bearing temperature is elevated since the clearance 59 is provided to accommodate such expansion.

Nuts are provided on the two ends of the rods as illustrated in FIG. 3 only when access to both ends of the bearing is possible as, for example, when the bearing is located in the outboard strut of a ship. It should be understood, however, that if desired the embodiment of FIG. 3 can be provided with tapped holes into which the rods are threaded as in the embodiment of FIGS. 2 and 2a.

Figure 4:
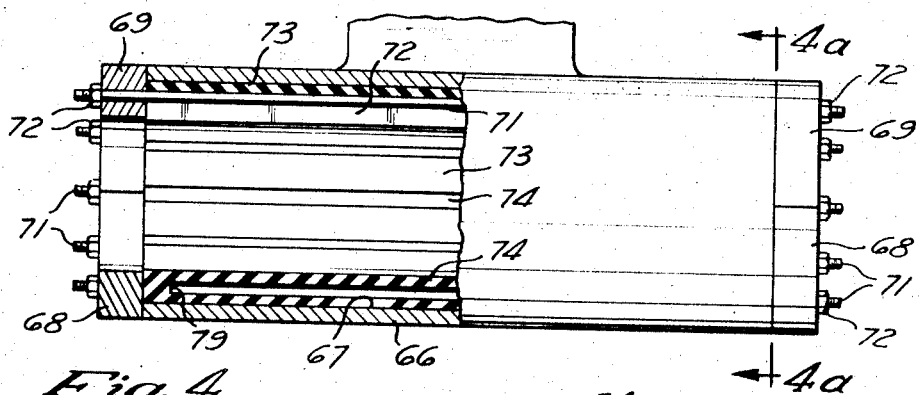
Figure 4A:
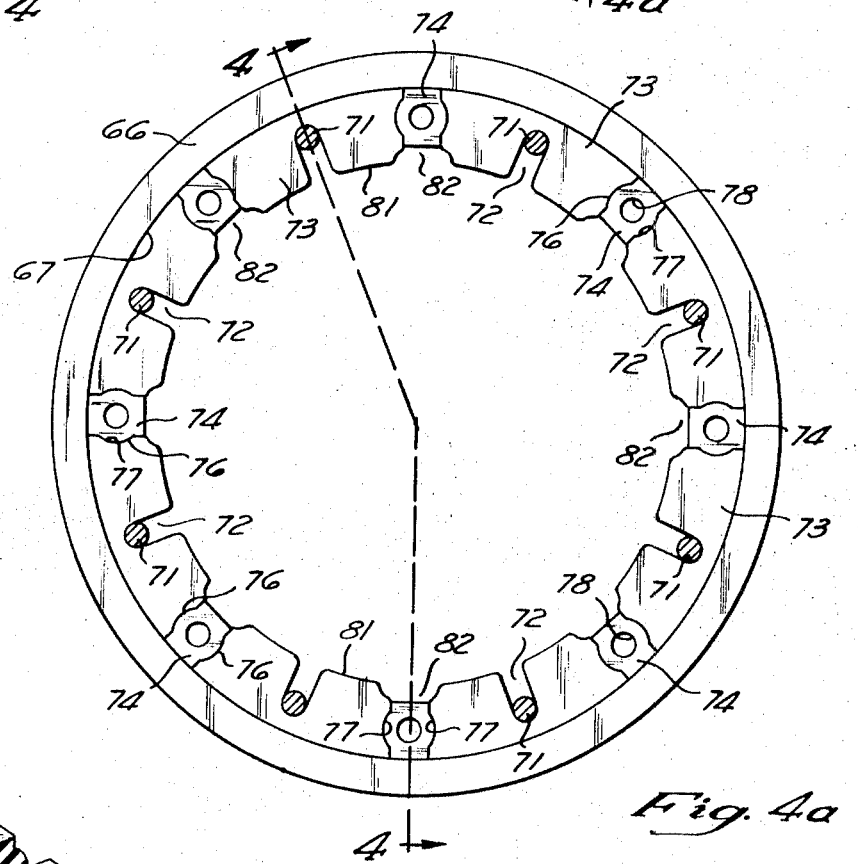
FIG. 4a is an enlarged end view of the bearing illustrated in FIG. 4 taken generally along 4a—4a of FIG. 4.
Figure 4B:
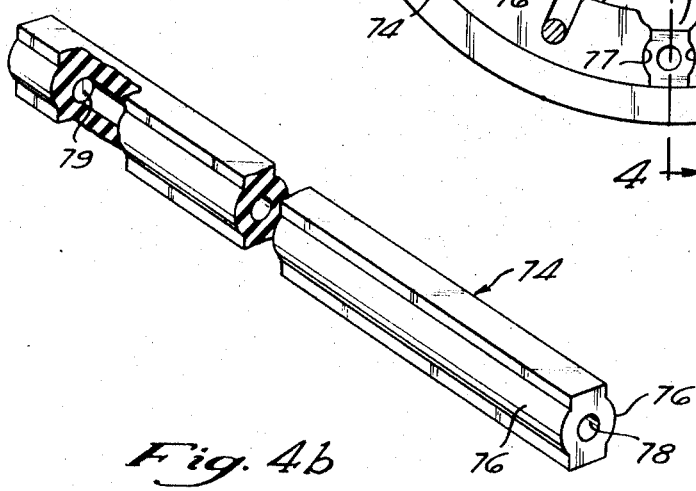

FIGS. 4, 4a, and 4b illustrate another embodiment of this invention. In this embodiment, the bearing housing 66 is provided with a smooth cylindrical bore 67 which extends to both ends of the housing and removable end plates 68 and 69 are provided at both ends of the housing 66. The tie bolts or rods 71 are threaded at both ends and are provided with nuts 72 at both ends to secure the associated end plates in position. In the illustration of FIG. 4, the means for accurately locating the end plates on the housing 66 is not illustrated. However, locating means are provided such as the keyways and keys as illustrated in FIG. 2 or alignment pins as illustrated in FIG. 3.

In this embodiment, the rods 71 extend along central water grooves 72 in the staves 73 in the same manner as in the embodiment of FIG. 2. However, in this embodiment the soft rubber inserts 74 are positioned between adjacent staves. The staves and inserts are sized and proportioned so that the inserts 74 produce a peripherally directed compressive force. Such force insures that the staves 73 properly seat against the inner wall 67 of the housing 66. The soft rubber inserts 74 are shaped with lateral projections 76 which mate with recesses 77 in the staves to provide an interlocking structure to insure that the inserts remain in proper position.

The inserts 74 are also formed with longitudinally extending openings 78 which extend to an end wall 79 as illustrated in FIGS. 4 and 4b. These longitudinal openings 78 provide clearance to allow for peripherally directed expansion and contraction of the staves 73 caused by changes in temperature. They also provide a simple means for inserting the inserts. The assembly of this embodiment is as follows. The lower compliment of rods 71 and stave 73 are first positioned in the bearing. The lower compliment of inserts are then assembled into position by positioning a rod in the opening 78 and pushing the insert along the adjacent stave until they are properly positioned. Because the rods extend to the far end and engage the end wall 79, pushing of the rods tends to elongate the inserts and reduce their lateral dimension so that they can slide into position even though an interference fit is provided. After the inserts are assembled, the rods are pulled out of the opening 78. The lower end plate 68 on the assembly end is then installed. It should be understood that it is preferable to position the end plate 68 on the left end of the bearing as viewed in FIG. 4 prior to the insertion of the inserts to assist in holding the staves in their proper position during such assembly.

Because the inserts 74 are formed of relatively soft rubber and because they are hollow, they function as a relatively soft spring to laterally compress the staves a small amount. They also permit peripherally directed thermal expansion and prevent water and other foreign matter from reaching the outer surface of the staves. The principal mounting of the staves, however, is provided in this embodiment by the rods 71. The proportions of the inserts are arranged so that they do not extend radially inward to the inner bearing surface 81 and, consequently, cooperate with the adjacent staves to provide a water groove 82 which cooperates with the groove 72 to properly lubricate the bearing.

Figure 4C:
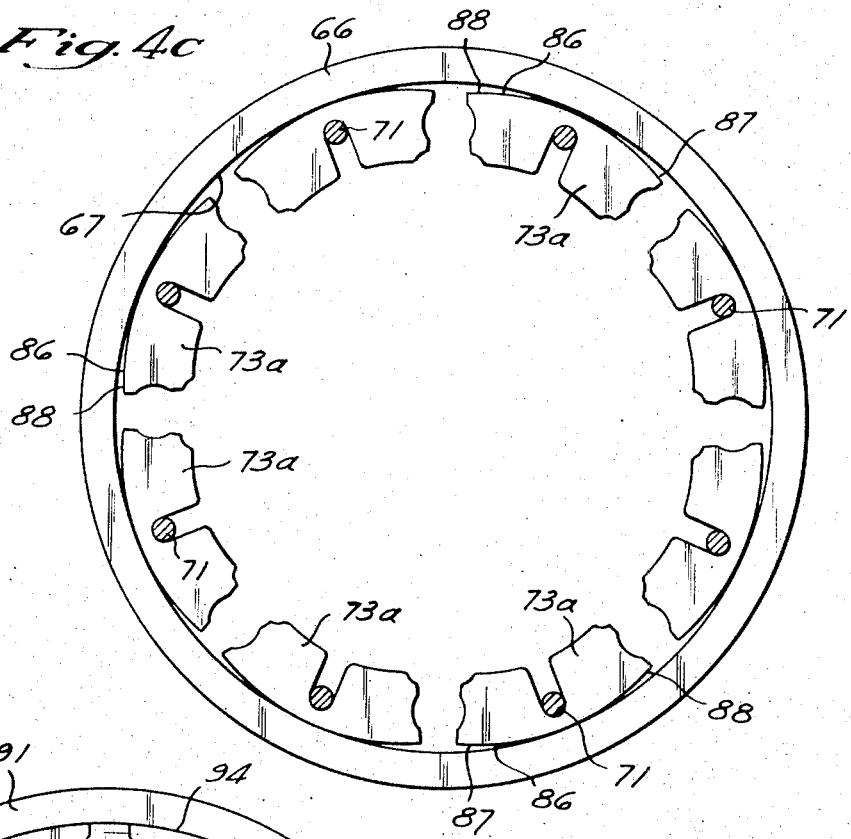
FIG. 4c is an end view similar to FIG. 4a illustrating the structure prior to the insertion of the inserts of FIG. 4b.

FIG. 4c illustrates the manner in which the embodiment of FIGS. 4, 4a, and 4b may be used to permit a given stave section to be used in a variety of bearing sizes. As shown in FIG. 4c, the bearing stave 73a may be shaped when unstressed so that they have a different radius of curvature than the inner surface 67 and do not seat fully with the inner surface 67 of the housing 66. In this illustrated embodiment, the outer surfaces 86 have a smaller radius of curvature than the inner surface 67 of the housing 66. Consequently, when unstressed, the staves diverge from the housing at 87 and 88. The staves, however, are held in proper position by the rods 71. When the inserts 74 are assembled, they provide sufficient lateral force to cause the staves 73a to deform from their unstressed condition of FIG. 4c to a fully seated condition as illustrated in FIG. 4a. In order to accommodate this deformation, the material of the staves 73a must be sufficiently soft when compared to the forces developed by the inserts 74 to allow the inserts to deform the stave to the seated condition. Because the staves need not be formed with the same curvature as the housing, a given stave can be used in different sized bearings by appropriately changing the number of the staves in the bearing and appropriately sizing the inserts 74. This ability to use a given stave size in different sized bearings improves the economies of manufacture of the bearings since it is not necessary to provide a different sized stave for each size of the bearing required.

Figure 5:
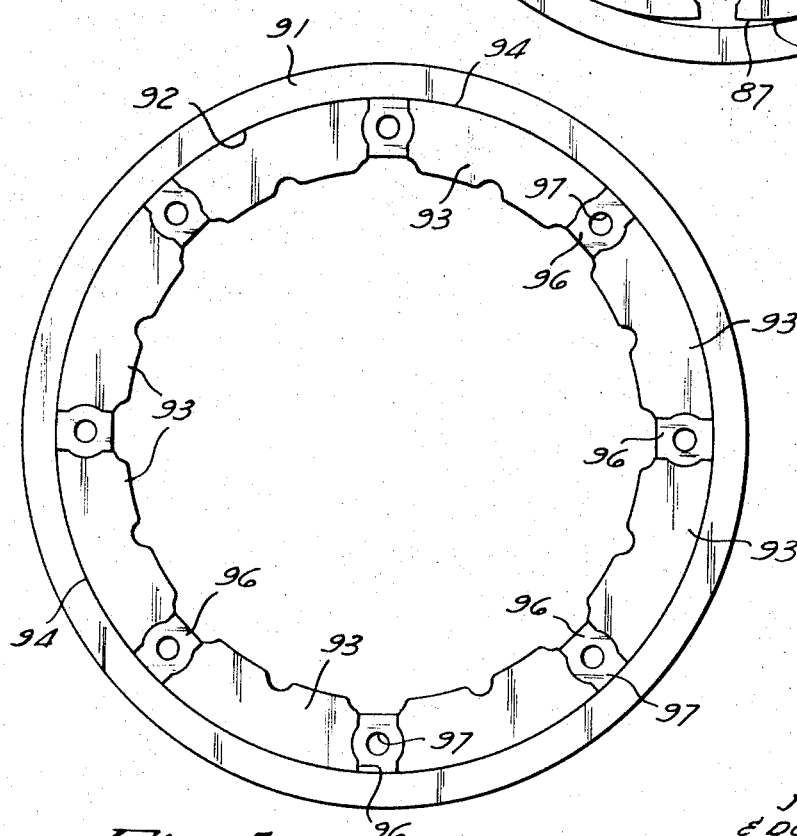
FIG. 5 is another embodiment of a bearing in accordance with this invention in which elongated rubber inserts provide the principal mounting of the staves within the bearing housing.

FIG. 5 discloses still another embodiment of this invention wherein mounting rods are not utilized to position the stave within the bearing housing. In this embodiment, the bearing housing 91 is again provided with a smooth cylindrical bore 92. A plurality of similar staves 93 are positioned within the bore so that their outer surfaces 94 engage the bore 92. Positioned between each stave and the adjacent stave is an insert 96 formed of elastomeric material. The shape of the insert 96 is the same as the shape of the inserts 74 illustrated in FIG. 4 and their function is similar. The various elements of the assembly are proportioned so that the inserts 96 provide an interference fit and are deformed from their unstressed condition. Therefore, the inserts provide a peripherally directed force tending to cause separation of the staves 93 and thereby produce sufficient radial force between the outer surfaces 94 of each stave and the bore 92 to securely retain the staves in position.

When this embodiment is utilized, end plates are provided at at least one end of the housing 91 which are secured to the housing in any suitable manner such as with studs mounted in the housing which extend through suitable openings in the end plates and which are provided with nuts to secure the end plates in position.

Here again, the inserts are assembled in position by placing a rod along the opening 97 in the inserts so that it engages the end wall at the inner end and places the insert in tension as the rod is pushed axially to move the insert into position between the staves. Such tension, of course, reduces the lateral dimension of the insert allowing it to move into position even though an interference fit is provided. After the insert is properly positioned, the rod is removed allowing the insert to expand radially to provide the mounting force required. Such inserts prevent water from reaching the interface between the bearing housing and the stave. Since the pressure provided by the inserts is sufficient to prevent a lubrication film of water from existing at the interface between the staves and the housing, a relatively high friction exists at this location which prevents the bearing staves from moving with respect to the housing when the bearing is used.

Figure 6:
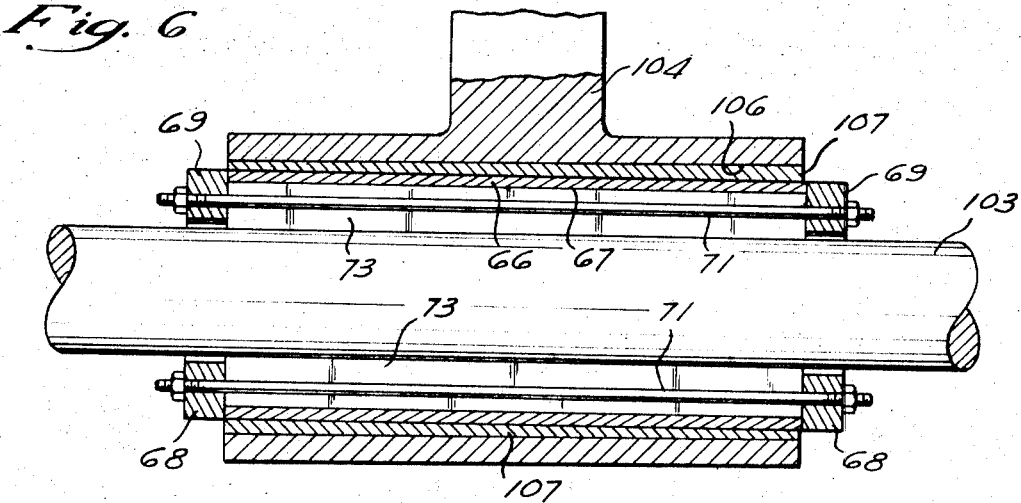
FIG. 6 is a longitudinal section of still another embodiment of this invention in which the bearing is provided with a relatively thin housing which is secured in position by a layer of material which is cast in place.
Figure 6A:
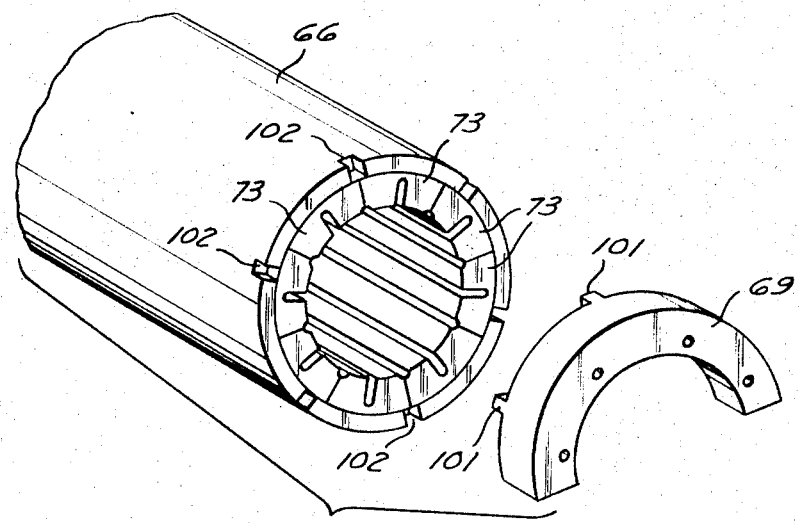
FIG. 6a is an exploded perspective view of the bearing illustrated in FIG. 6 showing the bearing elements partially disassembled.

FIGS. 6 and 6a disclose still another aspect of this invention. In many instances it is difficult to provide a ship's structure with an accurately machined bearing housing or strut proportioned and positioned to receive the bearing housing. In such instances, the present invention provides a structure and method of installation of the bearing which permits easy alignment of the bearing. In the embodiment of FIG. 6, a bearing is constructed as illustrated in the embodiment of FIG. 4. The bearing housing 66 is provided with a cylindrical inner bore 67 in which the staves 73 are mounted. The rods 71 extend through the end plates 68 and 69 to removably secure such end plates in position. As best illustrated in FIG. 6a, the end plates 68 and 69 are formed with radially extending keys 101 which fit into mating keyways 102 formed in the end of the housing 66 to properly position the end plates with respect to the housing.

The mounting of the bearing assembly is accomplished by positioning the bearing around the shaft 103 within the supporting structure of the ship which, in this embodiment, is a stern strut 104. The strut 104 is provided with a bore 106 which loosely receives the housing 66 with a substantial amount of clearance. The shaft 103 is held in the proper position with suitable means (not illustrated) and the bearing assembly is positioned up against the lower side of the shaft so that all of the bearing clearance is located at the top of the shaft as illustrated in FIG. 2a. With the bearing thus properly positioned within the bore 106 in the strut, a suitable mounting material is cast into the clearance between the outisde of the bearing housing 66 and the bore 106. This casting material 107 may be of any suitable type such as a bearing babbitt material which melts at a relatively low temperature and can be cast in place, or high strength plastic material such as epoxy resins or the like. The cast material 107 permanently secures the bearing housing 66 in the proper position within the bore 106 so that the bearing properly supports the shaft 103. Because the bearing is cast in place, it is not necessary to accurately form the bore 106 and the bore 106 can be such that it is out of alignment with the bearing an amount accommodated by the clearance provided and the thickness of the casting material.

In some instances, it is desirable to provide the outer surface of the housing 66 with knurling or other types of roughness to assist the casting material in forming a mechanical lock or anchoring structure. Similarly, the bore 106 is preferably roughened to provide a mechanical interlocking with the outer surface of the casting material. In any event, with this embodiment of the invention, the housing 66 may be relatively thin since it is fully supported by the cast material and inturn the supporting strut of the ship. Therefore, the thickness of the housing need not be sufficient to independently support the bearing loads. It is possible to use such structure since the mounting of the staves does not impose any particular thickness requirement with respect to the housing.

In all of the illustrated embodiments of this invention, endwise clearance is preferably provided to accommodate longitudinal thermal expansion of the staves and means are provided to accommodate peripherally directed lateral thermal expansion and contraction. Consequently, excessive changes in the radial clearance of the bearing do not occur under wide variations in temperature since the only effect of thermal expansion and contraction results from the radial expansion and contraction of the bearing staves, and such change in dimensions is relatively small.

Although preferred embodiments of this invention are illustrated, it is to be understood that various modifications and rearrangements of parts may be resorted to without departing from the scope of the invention disclosed and claimed herein.

What is claimed is:

1. A water lubricated bearing comprising housing means providing a generally cylindrical inner housing surface, a compliment of separate elongated staves each providing an inner bearing surface portion formed of elastomeric material and an outer stave surface portion engaging said inner housing surface, said compliment of staves cooperating to define a a journal providing a plurality of inner bearing surface portions adapted to journal a shaft, a plurality of rods removably mounted at their ends in said housing means and extending lengthwise of said staves, said rods mechanically securing said staves in position within said housing means, said staves being removable and replaceable in said housing means by endwise movement with respect to said housing means, said staves providing portions which extend between said inner housing surface and the associated rods.

2. A water lubricated bearing as set forth in claim 1 wherein a shaft extends through said bearing with radial clearance, said staves being removable and replaceable in said housing means without removing said shaft, said staves cooperating to provide axially extending openings which allow expansion of the material of said staves in a peripheral direction.

3. A water lubricated bearing as set forth in claim 1 wherein said rods are spaced inwardly from said inner housing surface, and said staves are provided with axially extending surfaces which engage associated rods to secure said staves in proper position within said housing and support said staves along their length.

4. A water lubricated rubber bearing as set forth in claim 1 wherein each stave is formed with a radially extending recess extending along its length, and the associated rod is positioned in said recess.

5. A water lubricated bearing as set forth in claim 4 wherein said recess is of sufficient depth to allow substantial peripherally directed thermal expansion as well as providing a water groove for lubricating said bearing.

6. A water lubricated bearing as set forth in claim 5 wherein said staves when unstressed are provided with an external radius of curvature different from the radius of curvature of said inner housing surface, and resilient means are provided to produce a peripherally directed force which deform said staves from their unstressed condition and causes them to seat against said inner housing surface.

7. A water lubricated bearing as set forth in claim 6 wherein said resilient means includes an elastomeric insert positioned between at least two staves.

8. A water lubricated bearing as set forth in claim 7 wherein an elastomeric insert is positioned between each pair of staves.

9. A water lubricated bearing as set forth in claim 8 wherein said inserts resist entry of water into the interface between said staves and said inner housing surface.

10. A water lubricated bearing as set forth in claim 7 wherein said elastomeric insert is operable to accommodate peripherally directed thermal expansion and contraction of said staves.

11. A water lubricated bearing as set forth in claim 10 wherein said elastomeric insert is formed with an opening extending along its length to accommodate said expansion and contraction.

12. A water lubricated bearing as set forth in claim 11 wherein said housing means includes a removable end cap which is operable to axially locate said staves in said housing means in at least one direction, said housing means providing means to locate said end cap, and said rods secure said end cap in its mounted position.

13. A water lubricated bearing as set forth in claim 12 wherein a shaft is journaled in said bearing with clearance, and said rods and staves are axially removable without removing said shaft.

14. A water lubricated bearing as set forth in claim 13 wherein said housing assembly includes a removable end cap at each end of said staves both of which are secured in their mounted position by said rods.

15. A water lubricated bearing as set forth in claim 14 wherein said staves are formed entirely of elastomeric material, and said end caps confine said staves with axial clearance.

16. A water lubricated bearing comprising housing means providing a generally cylindrical inner housing surface, a compliment of separate elongated staves each providing an inner bearing surface portion formed of elastomeric material and an outer stave surface portion engaging said inner housing surface, said compliment of staves cooperating to define a journal providing a plurality of inner bearing surface portions adapted to journal a shaft, a plurality of rods removably mounted at their ends in said housing means and extending lengthwise of said staves, said rods mechanically securing said staves in position within said housing means, said staves being removable and replaceable in said housing means by endwise movement with respect to said housing means, said housing assembly including a tubular member providing said inner housing surface, a support member formed with an opening in which said tubular member is positioned with clearance, and castable material in said clearance supporting said tubular member in said support member in a predetermined position.

17. A water lubricated bearing comprising a housing assembly providing a generally cylindrical inner housing surface, a compliment of separate elongated staves each providing an inner bearing surface portion formed of elastomeric material and an outer stave surface portion engaging said inner housing surface, a compliment of staves cooperating to define a journal providing a plurality of inner bearing surface portions adapted to journal a shaft, and an elastomeric insert positioned between each pair of said staves providing a peripherally directed force which causes mating engagement between said inner housing surface and said outer stave surface portion.

18. A water lubricated bearing as set forth in claim 17 wherein said inserts resist entry of water and other foreign matter into the interface betwen said staves and said inner housing surface.

19. A water lubricated bearing as set forth in claim 17 wherein said staves are formed of elastomeric material, and the elastomeric material of said insert is softer than the elastomeric material of said stave.

20. A water lubricated bearing as set forth in claim 19 wherein said elastomeric insert is radially spaced from said inner bearing surface portions in a direction toward said inner housing surface.

21. A water lubricated bearing comprising a housing assembly providing a generally cylindrical inner housing surface, a compliment of separate elongated staves each providing an inner bearing surface portion formed of elastomeric material and an outer stave surface portion engaging said inner housing surface, a compliment of staves cooperating to define a journal providing a plurality of inner bearing surface portions adapted to journal a shaft, and an elastomeric insert positioned between at least two of said staves providing a peripherally directed force which causes mating engagement between said inner housing surface and said outer stave surface portions, said elastomeric insert being formed with an opening extending along its length to accommodate peripherally directed expansion and contraction of said staves.

22. A water lubricated bearing as set forth in claim 21 wherein said opening in said elastomeric insert is open to one end of said insert and is closed by an end wall adjacent to the other end of said insert, said end wall being engagable by a push member extending along said opening to elongate said insert for movement into position between adjacent staves.

23. A water lubricated bearing comprising a housing assembly providing a generally cylindrical inner housing surface, a compliment of separate elongated staves each providing an inner bearing surface portion formed of elastomeric material and an outer stave surface portion engaging said inner housing surface, a compliment of staves cooperating to define a journal providing a plurality of inner bearing surface portions adapted to journal a shaft, and an elastomeric insert positioned between at least two of said staves providing a peripherally directed force which causes mating engagement between said inner housing surface and said outer stave surface portions, said staves when unstressed being formed so that said outer stave surface portion has a different radius of curvature from said inner housing surface, and said elastomeric insert provides sufficient peripherally directed force to deform said staves from their unstressed condition until said outer stave surface portion is in mating engagement with said inner housing surface.

* * * * *